US011262470B2

(12) United States Patent
Chen et al.

(10) Patent No.: US 11,262,470 B2
(45) Date of Patent: Mar. 1, 2022

(54) METHOD OF LOW-FREQUENCY SEISMIC DATA ENHANCEMENT FOR IMPROVING CHARACTERIZATION PRECISION OF DEEP CARBONATE RESERVOIR

(71) Applicant: Chengdu University of Technology, Chengdu (CN)

(72) Inventors: Xuehua Chen, Chengdu (CN); Jie Zhang, Chengdu (CN); He Xu, Chengdu (CN); Wei Jiang, Chengdu (CN); Xin Luo, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 17/133,649

(22) Filed: Dec. 24, 2020

(65) Prior Publication Data

US 2021/0199830 A1 Jul. 1, 2021

(30) Foreign Application Priority Data

Dec. 25, 2019 (CN) .......................... 201911353724.3

(51) Int. Cl.
*G01V 1/36* (2006.01)
(52) U.S. Cl.
CPC ...................... *G01V 1/36* (2013.01)
(58) Field of Classification Search
CPC ....................................................... G01V 1/36
See application file for complete search history.

(56) References Cited

U.S. PATENT DOCUMENTS 6,131,071 A * 10/2000 Partyka .................. G01V 1/301
702/16
6,745,129 B1 * 6/2004 Li ............................ G01V 1/30
702/17

(Continued)

FOREIGN PATENT DOCUMENTS

CN 102928879 A 2/2013
CN 104280765 A 1/2015

(Continued)

OTHER PUBLICATIONS

Yongshou Dai et al., Time-varying mixed phase wavelet extraction based on time-frequency spectrum simulation, Journal of Petroleum Geophysical Exploration, 2015, pp. 830-838, 50(5).

(Continued)

*Primary Examiner* — Raymond L Nimox

(57) ABSTRACT

A method of low-frequency seismic data enhancement for improving the characterization precision of a deep carbonate reservoir includes: first performing inversions on an input seismic data set to obtain the corresponding reflection coefficients and average seismic wavelet; then constructing a seismic wavelet with rich low-frequency information; and finally, performing convolution on the seismic wavelet with rich low-frequency information and the reflection coefficients to obtain seismic data with rich low-frequency information and enhanced low-frequency energy. In the present invention, changes of the seismic data in a work area in transverse and longitudinal directions are taken into consideration, and processing parameters can be quickly determined according to actual conditions of the work area to obtain an optimal processing effect. In this way, the characterization quality of geological anomalies, such as a fault, a fracture system, or the like, in a deep carbonate reservoir can be improved significantly.

1 Claim, 5 Drawing Sheets

(56) References Cited

U.S. PATENT DOCUMENTS

| | | | | |
|---|---|---|---|---|
| 7,525,873 B1* | 4/2009 | Bush | ................. | G01V 1/28 |
| | | | | 367/37 |
| 2010/0270026 A1* | 10/2010 | Lazaratos | ............. | G01V 1/36 |
| | | | | 166/369 |
| 2015/0012256 A1 | 1/2015 | Routh et al. | | |
| 2015/0168573 A1* | 6/2015 | Zhang | ................. | G01V 1/307 |
| | | | | 702/17 |
| 2016/0116620 A1* | 4/2016 | Sassen | ............... | G01V 1/368 |
| | | | | 702/17 |
| 2017/0199289 A1* | 7/2017 | Peng | .................. | G01V 1/375 |
| 2018/0017692 A1* | 1/2018 | Soubaras | ........... | G01V 1/362 |

FOREIGN PATENT DOCUMENTS

| | | |
|---|---|---|
| CN | 106873038 A | 6/2017 |
| CN | 108020863 A | 5/2018 |
| CN | 109633744 A | 4/2019 |
| CN | 109738951 A | 5/2019 |
| CN | 110146923 A | 8/2019 |
| WO | 2012134621 A1 | 10/2012 |

OTHER PUBLICATIONS

Hakan Karsli et al., A procedure to reduce side lobes of reflection wavelets: A contribution to low frequency information, Journal of Applied Geophysics, 2013, pp. 107-118, 96.

Chen Xue-Hua et al., Seismic low-frequency-based calculation of reservoir fluid mobility and its applications, Applied Geophysics, Sep. 2012, pp. 326-332, vol. 9, No. 3.

* cited by examiner

METHOD OF LOW-FREQUENCY SEISMIC DATA ENHANCEMENT FOR IMPROVING CHARACTERIZATION PRECISION OF DEEP CARBONATE RESERVOIR

CROSS REFERENCE TO THE RELATED APPLICATIONS

This application is based upon and claims priority to Chinese Patent Application No. 201911353724.3, filed on Dec. 25, 2019, the entire contents of which are incorporated herein by reference.

TECHNICAL FIELD

The present invention pertains to the field of petroleum seismic exploration, and relates to a method of low-frequency seismic data enhancement for improving the characterization precision of a deep carbonate reservoir, and the imaging precision of various effective geological features in the deep carbonate reservoir can be improved significantly after processing seismic reflection data of a deep carbonate fracture-cavity reservoir and a reef flat reservoir by the method of the present invention.

BACKGROUND

Currently, seismic data is conventionally acquired using a seismic source and a geophone. This method of obtaining seismic data typically lacks low-frequency components due to the constrained functions of the hardware of the seismic source and the receiver. Especially in many areas of China, not only are geological structures and spatial distribution complicated but the carbonate reservoir is deeply buried as well. It also contains an internal structure with strong heterogeneity and anisotropy, which causes serious problems of absorption attenuation in seismic exploration signals. The seismic reflection signal of the deep carbonate reservoir has a weak amplitude, a low dominant frequency, a narrow frequency band and a low signal-to-noise ratio, resulting in the following issues: an unclear reflection of the structure of the deep carbonate reservoir, poor transverse distribution and traceability of the stratum, and the inconclusiveness in the characterization of the fracture system and prediction of fracture-developed areas of the reservoir.

Rich and reliable seismic low-frequency information has important implications for the exploration of deep oil and gas reservoirs. For the characterization of the deep carbonate reservoir, the seismic data with rich low-frequency components and strong low-frequency energy can significantly improve the imaging quality of geological abnormal information, such as a fault, a fracture system, or the like. When a seismic wave propagates in a viscoelastic medium, high-frequency components of the seismic signal are absorbed more easily due to factors such as stratum absorption and energy attenuation, while low-frequency components of the seismic signal are attenuated less and propagated more deeply compared with the high-frequency components. Therefore, effective low-frequency information in the seismic data can be fully utilized to facilitate the improvement of the resolution of the seismic reflection wave of a deep stratum and the imaging quality of a deep geologic body. Additionally, the more complete the low-frequency components and the stronger the low-frequency energy of the seismic signal, the fewer the side lobes of wavelets in the seismic reflection wave. The side lobes with weaker energy than main lobes, facilitate the improvement of the resolution of the seismic data. Currently, in some conventional methods for enhancing low-frequency information, compensation operators (also called frequency broadening operators) are typically constructed based on existing seismic data, which involves a variety of control parameters. As a result, when applied to actual data processing, such methods involve a complicated process of parameter adjustment, and thus are difficult to obtain the optimal processing effect.

SUMMARY

The object of the present invention is to provide a method of a low-frequency seismic data enhancement for effectively improving the characterization precision of a deep carbonate reservoir, including the following steps:

(1) inputting a seismic data set, first performing an inversion using statistical information of seismic data to obtain the seismic wavelet of each seismic trace in the input data set, and then performing an inversion using an optimized sparse regularization method to obtain the reflection coefficient of each seismic trace in the input data set:

(2) obtaining a seismic wavelet $w_b$ with rich low-frequency information by the following sub-steps:

2-1 calculating an average seismic wavelet $w_a$ of the input seismic data set based on the seismic wavelets obtained by the inversion in step (1);

2-2 performing an N-point Fourier transform on the average seismic wavelet $w_a$, and obtaining a normalized amplitude spectrum $S_a$ of the average seismic wavelet $w_a$, wherein N represents the number of sampling points contained in a seismic trace;

2-3 determining a reference position n=N/2, and setting a control parameter $P_a$ and a control parameter $P_b$;

2-4 calculating a new amplitude spectrum $S_b$ according to the following formula:

$$S_b(j) = \begin{cases} S_b(j) = 0.5\left\{1 + \cos\left[\pi\left(\dfrac{2j}{nP_a} - 1\right)\right]\right\}P_b, & 1 \le j < \dfrac{P_a(n-1)}{2} \\ S_b(j) = S_a(j), & j > h \\ S_b(j) = P_b, & \text{otherwise} \end{cases},$$

wherein j is a sampling point number, and h is a sampling point number corresponding to the maximum value in the normalized amplitude spectrum $S_a$;

2-5 calculating a conversion coefficient C according to the following formula:

$$C = S_a \circ \frac{1}{S_b},$$

wherein ∘ represents an elementary product operation;

2-6 calculating a temporary seismic wavelet w according to the following formula:

w=real(ift(ft($w_a$)∘C)), wherein ft(g) represents Fourier transform, ift(g) represents inverse Fourier transform, and real(g) represents the real part of complex number;

2-7 calculating a scale transformation coefficient λ according to the following formula:

$$\lambda = \frac{sum(S_a)}{sum(S_b)},$$

wherein sum(g) represents a summation operation; and 2-8 calculating the seismic wavelet $w_b$ with rich low-frequency information according to the following formula:

$$w_b = \frac{w}{\lambda};$$

(3) convoluting the seismic wavelet $w_b$ with the reflection coefficients obtained by the inversion in step (1), so as to finally obtain a seismic data set with rich low-frequency information and enhanced low-frequency energy.

Further, it should be noted that the control parameter $P_a$ in step (2) has a value range of $$[0.01, \frac{2h}{n-1}),$$

when the value of the control parameter $P_a$ decreases, the number of enhanced low-frequency components increases, and when the value of the control parameter $P_a$ increases, the number of the enhanced low-frequency components decreases. The control parameter $P_b$ in step (2) has a value range of [1, 3], when the value of the control parameter $P_b$ decreases, the energy of the enhanced low-frequency components decreases, and when the value of the control parameter $P_b$ increases, the energy of the enhanced low-frequency components increases.

BRIEF DESCRIPTION OF THE DRAWINGS

FIG. 1A shows the average seismic wavelet $w_a$ of the input seismic data set, wherein the ordinate represents amplitude and the abscissa represents time in milliseconds (ms). FIG. 1B shows an amplitude spectrum of the average seismic wavelet $w_a$, wherein the ordinate represents amplitude and the abscissa represents frequency in hertz (Hz). FIG. 1C shows the seismic wavelet $w_b$ with rich low-frequency information, wherein the ordinate represents amplitude and the abscissa represents time in milliseconds (ms). FIG. 1D shows an amplitude spectrum of the seismic wavelet $w_b$ with rich low-frequency information, wherein the ordinate represents amplitude and the abscissa represents frequency in hertz (Hz).

FIG. 2A shows an original seismic section before the low-frequency-information enhancement, wherein the abscissa represents a trace number and the ordinate represents time in seconds-(s). FIG. 2B shows a seismic section after performing the low-frequency-information enhancement using the method according to the present invention, wherein the abscissa represents a trace number and the ordinate represents time in seconds-(s).

FIG. 3A shows the time slice of the variance attribute of the original seismic data at 4,452 ms before the low-frequency-information enhancement, wherein the abscissa represents an InLine line number and the ordinate represents an XLine line number. FIG. 3B shows the time slice of the variance attribute of the seismic data at 4,452 ms after performing the low-frequency-information enhancement using the method according to the present invention, wherein the abscissa represents an InLine line number and the ordinate represents an XLine line number.

DETAILED DESCRIPTION OF THE EMBODIMENTS

Figure 4:
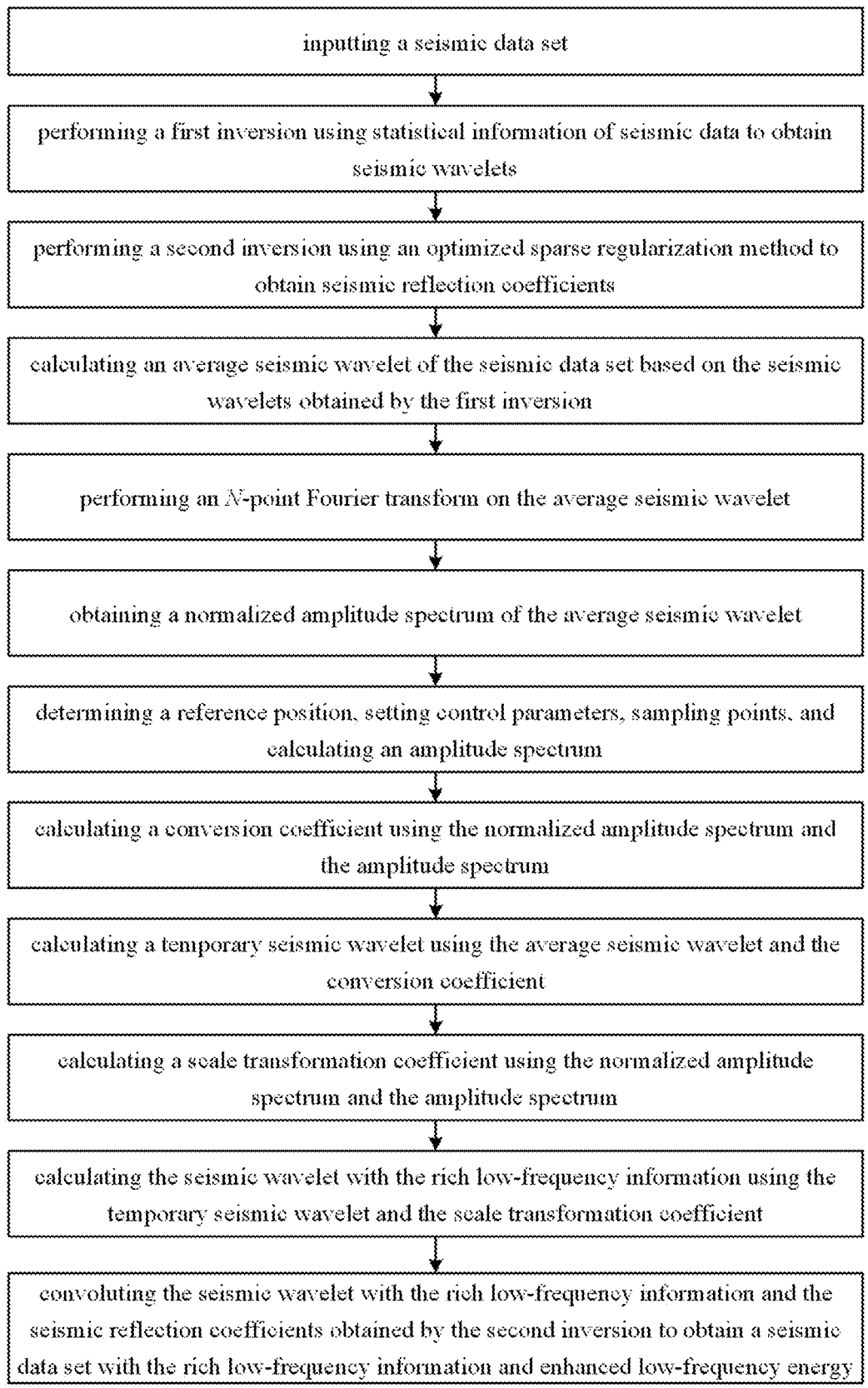
FIG. 4 shows an exemplary method of low-frequency seismic data enhancement for effectively improving the characterization precision of a deep carbonate reservoir.

As shown in FIG. 4, and according to an embodiment of the present invention, a method of low-frequency seismic data enhancement for effectively improving the characterization precision of a deep carbonate reservoir includes the following steps:

(1) a seismic data set is input, and in this embodiment, first an inversion is performed using statistical information of seismic data to obtain the seismic wavelet of each seismic trace in the input data set, and then an inversion is performed using an optimized sparse regularization method to obtain the reflection coefficient of each seismic trace in the input data set;

(2) a seismic wavelet $w_b$ with rich low-frequency information is constructed by the following sub-steps:

2-1 an average seismic wavelet $w_a$ of the input seismic data set is calculated based on the seismic wavelets obtained by the inversion in step (1);

2-2 an N-point Fourier transform is performed on the average seismic wavelet $w_a$, and a normalized amplitude spectrum $S_a$ of the average seismic wavelet $w_a$ is obtained, wherein N represents the number of sampling points contained in a seismic trace, and in this embodiment, N=1750;

2-3 a reference position n=N/2 is determined, and a control parameter $P_a$=0.07 and a control parameter $P_b$=1.5 are set;

2-4 a new amplitude spectrum $S_b$ is calculated according to the following formula:

$$S_b(j) = \begin{cases} S_b(j) = 0.5\{1 + \cos[\pi(\frac{2j}{nP_a} - 1)]\}P_b, & 1 \leq j < \frac{P_a(n-1)}{2} \\ S_b(j) = S_a(j), & j > h \\ S_b(j) = P_b, & \text{otherwise} \end{cases},$$

wherein j is a sampling point number, and h is a sampling point number corresponding to the maximum value in the normalized amplitude spectrum $S_a$;

2-5 a conversion coefficient C is calculated according to the following formula:

$$C = S_a \circ \frac{1}{S_b},$$

wherein $\circ$ represents an elementary product operation;

2-6 a temporary seismic wavelet w is calculated according to the following formula:

$$w = \text{real}(ift(ft(w_a) \circ C)),$$

wherein ft(g) represents Fourier transform, ift(g) represents inverse Fourier transform, and real(g) represents the real part of complex number;

2-7 a scale transformation coefficient λ is calculated according to the following formula:

$$\lambda = \frac{sum(S_a)}{sum(S_b)},$$

wherein sum(g) represents a summation operation; and 2-8 the seismic wavelet $w_b$ with rich low-frequency information is calculated according to the following formula $$w_b = \frac{w}{\lambda};$$

(3) a convolution operation is performed on the seismic wavelet $w_b$ with rich low-frequency information and the reflection coefficients obtained by the inversion in step (1), so as to finally obtain a seismic data set with rich low-frequency information and enhanced low-frequency energy.

Figure 1A:
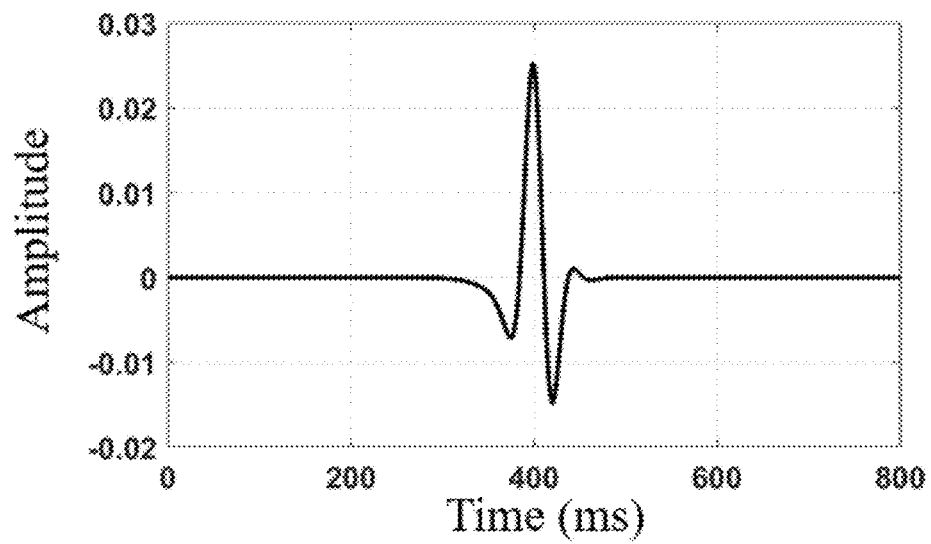
FIGS. 1A-1D show an average seismic wavelet $w_a$ and a corresponding seismic wavelet $w_b$ with rich low-frequency information of seismic data in a certain work area according to an embodiment of the present invention.
Figure 1B:
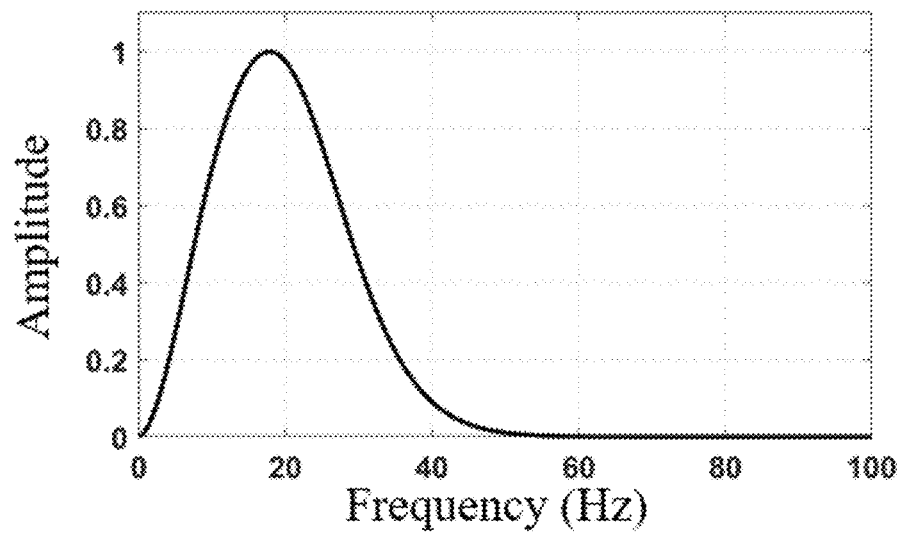
Figure 1C:
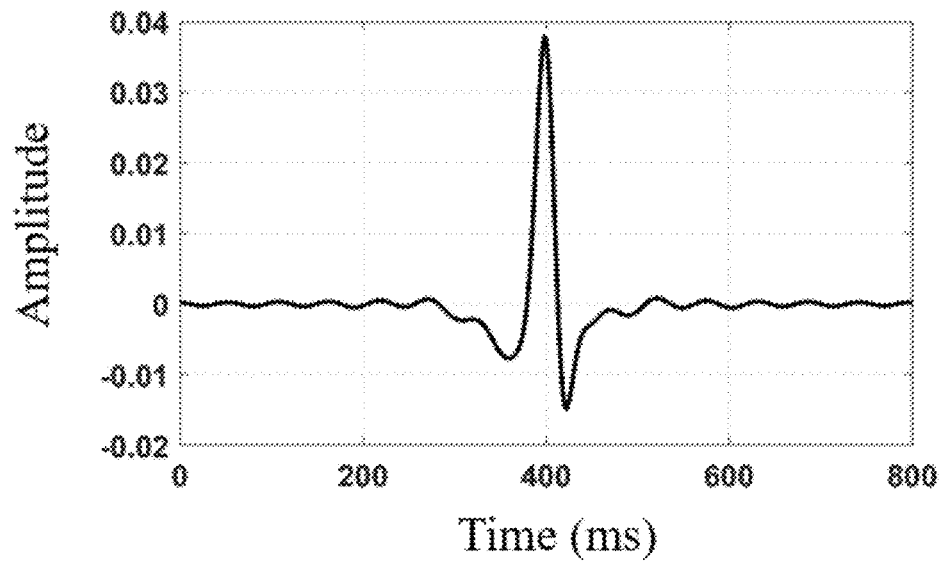
Figure 1D:
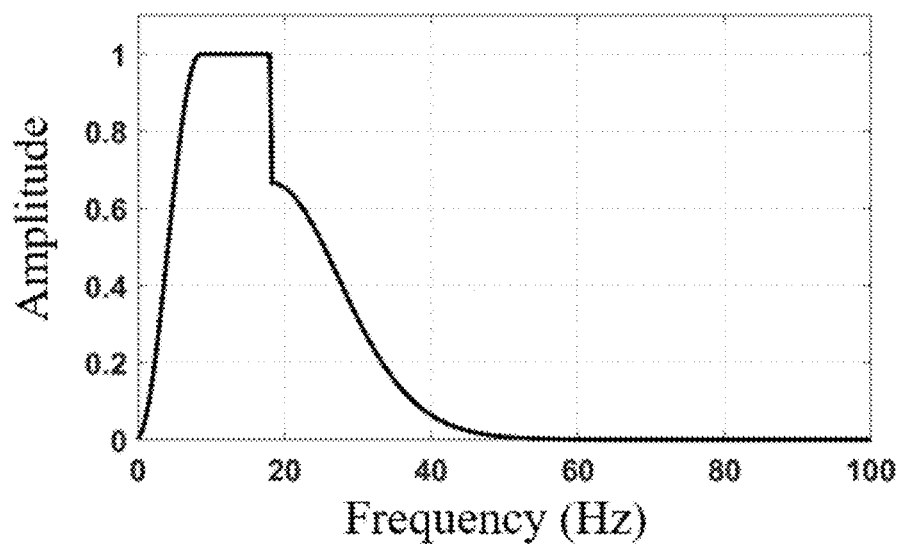

FIG. 1C and FIG. 1D show a seismic wavelet $w_b$ with rich low-frequency information and a normalized amplitude spectrum thereof corresponding to control parameters $P_a$=0.07 and $P_b$=1.5 based on the average seismic wavelet $w_a$ of the seismic data set of a certain work area according to an embodiment of the present invention.

Figure 2A:
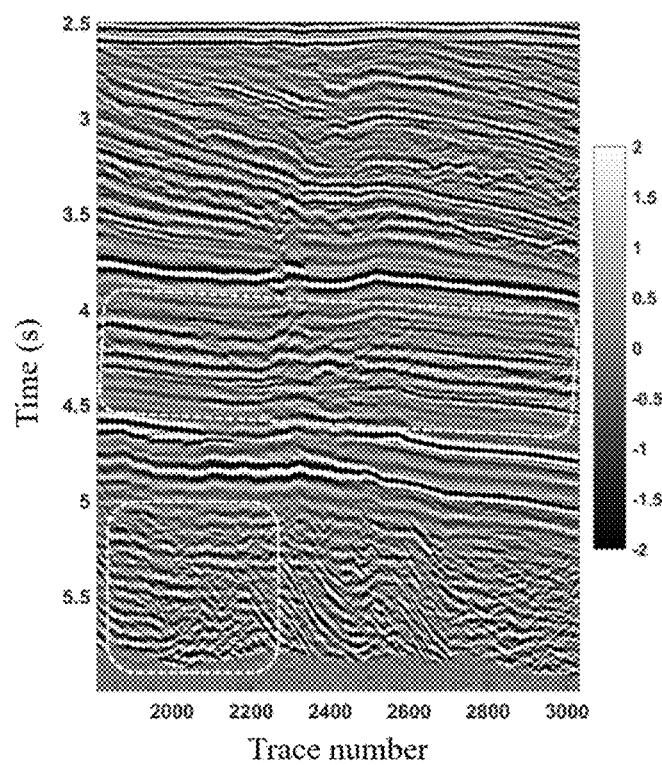
FIGS. 2A-2B show a comparison of seismic sections before and after low-frequency enhancement is performed on the seismic data set of the certain work area using the seismic wavelet $w_b$ with rich low-frequency information in FIG. 1C according to an embodiment of the present invention.
Figure 2B:
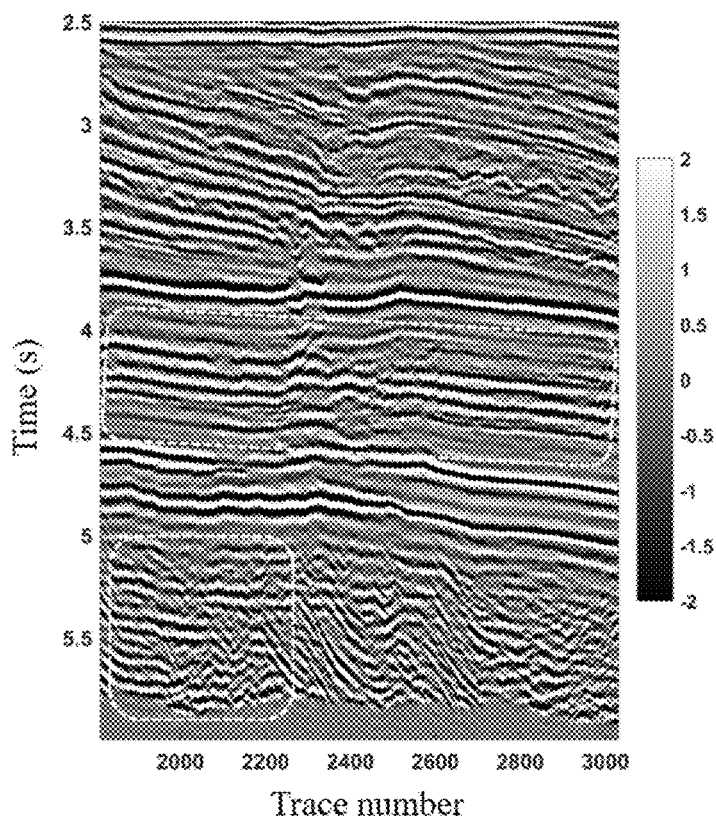

FIG. 2A and FIG. 2B show a comparison of seismic sections before and after low-frequency compensation is performed on the seismic data set of the certain work area using the seismic wavelet $w_b$ with rich low-frequency information in FIG. 1C according to an embodiment of the present invention, which illustrates that the imaging quality of a deep carbonate fracture system in FIG. 2B after low-frequency-information enhancement is better than the imaging quality of the original seismic section in FIG. 2A (for example, the areas outlined by the white dashed rectangles in FIG. 2A and FIG. 2B).

Figure 3A:
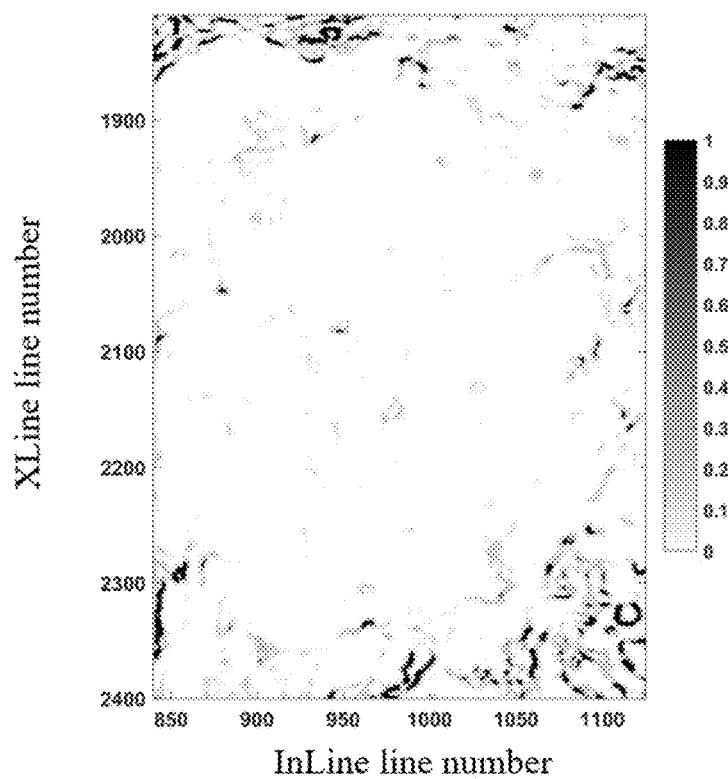
FIGS. 3A-3B show a comparison of time slices extracted from variance attributes of the seismic data set calculated before and after the low-frequency-information enhancement in the certain work area according to an embodiment of the present invention, which illustrates the difference in imaging quality of deep geological abnormal information in the seismic data before and after performing the enhancement using the method according to the present invention.
Figure 3B:
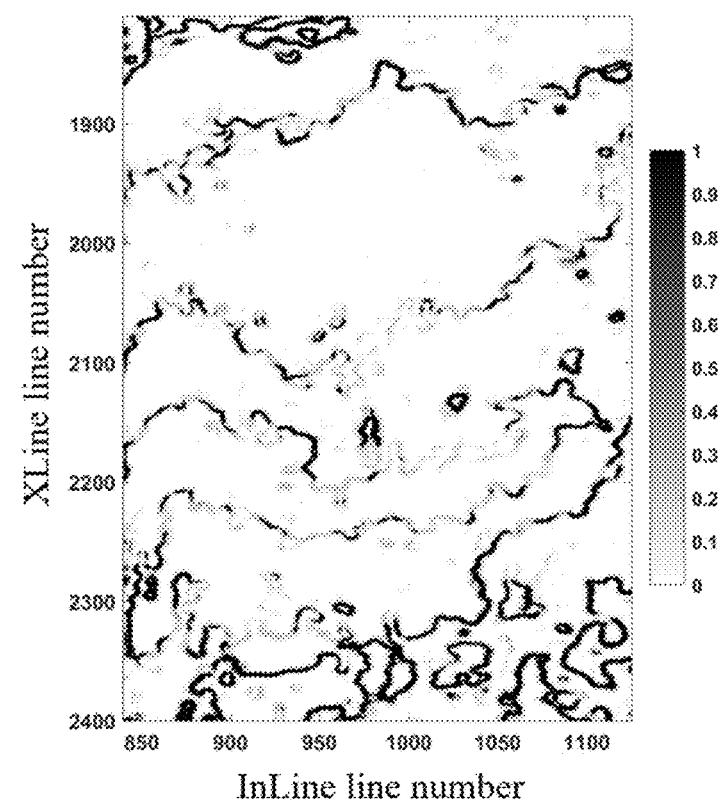

FIG. 3A and FIG. 3B show a comparison of time slices at 4,452 ms separately extracted from a variance-attribute data set of an original seismic data set in a certain work area and a variance-attribute data set of a seismic data set with enhanced low-frequency information according to an embodiment of the present invention, wherein the seismic data set with enhanced low-frequency information is obtained by performing low-frequency-information enhancement on the original seismic data set using the method of the present invention, and the variance-attribute data set of the original seismic data set and the variance-attribute data set of the seismic data set with enhanced low-frequency information are obtained by respectively calculating the variance attributes of the original seismic data set and the variance attributes of the seismic data set with enhanced low-frequency information. A comparison between FIGS. 3B and 3A indicate that, after performing the low-frequency-information enhancement using the method according to the present invention, the time slice of the variance attribute in FIG. 3B shows more and richer geological abnormal information more clearly.

The present invention has the following advantages: (1) the seismic wavelet with rich low-frequency information is constructed by using the average seismic wavelet of the whole input seismic data set, and changes of the seismic data in the work area in transverse and longitudinal directions are taken into consideration; (2) only 2 control parameters are involved, wherein the number of enhanced low-frequency components can be controlled by the parameter $P_a$, while the energy of the enhanced low-frequency components can be controlled by the parameter $P_b$. In a practical application in seismic data processing, the processing parameters can be quickly determined according to actual conditions of the data of the work area, so as to obtain the optimal processing effect.

The above embodiments are only used for illustrating the present invention, the implementation steps of the method, or the like, may be changed, and such equivalent changes and modifications based on the technical solution of the present invention shall fall within the scope of protection of the present invention.

What is claimed is:

1. A method of a low-frequency seismic data enhancement for improving a characterization precision of a deep carbonate reservoir, comprising the following steps:
    a) enhancing low-frequency seismic data by:
        (1) inputting a seismic data set, performing a first inversion using statistical information of seismic data to obtain seismic wavelets, and then performing a second inversion using an optimized sparse regularization method to obtain seismic reflection coefficients;
        (2) constructing a seismic wavelet $w_b$ with rich low-frequency information by the following sub-steps:
            (2-1) calculating an average seismic wavelet $w_a$ of the seismic data set based on the seismic wavelets obtained by the first inversion in step (1);
            (2-2) performing an N-point Fourier transform on the average seismic wavelet $w_a$, and obtaining a normalized amplitude spectrum $S_a$ of the average seismic wavelet $w_a$, wherein N represents a number of sampling points contained in a seismic trace;
            (2-3) determining a reference position n=N/2, and setting a control parameter $P_a$ and a control parameter $P_b$;
            (2-4) calculating an amplitude spectrum $S_b$ according to $$S_b(j) = \begin{cases} S_b(j) = 0.5\left\{1 + \cos\left[\pi\left(\frac{2j}{nP_a} - 1\right)\right]\right\}P_b, & 1 \leq j < \frac{P_a(n-1)}{2} \\ S_b(j) = S_a(j), & j > h \\ S_b(j) = P_b, & \text{otherwise} \end{cases},$$

wherein j is a sampling point number, and h is a sampling point number corresponding to a maximum value in the normalized amplitude spectrum $S_a$; the control parameter $P_a$ has a value range of $$[0.01, \frac{2h}{n-1}),$$

when a value of the control parameter $P_a$ decreases, a number of enhanced low-frequency components increases, and when the value of the control parameter $P_a$ increases, the number of the enhanced low-frequency components decreases; the control parameter $P_b$ has a value range of [1, 3], when a value of the control parameter $P_b$ decreases, the energy of the enhanced low-frequency components decreases, and when the value of the control parameter $P_b$ increases, the energy of the enhanced low-frequency components increases;

(2-5) calculating a conversion coefficient C according to $$C = S_a \circ \frac{1}{s_b},$$

wherein ∘ represents an elementary product operation;

(2-6) calculating a temporary seismic wavelet w according to $$w = \mathrm{real}(ift(ft(w_a) \circ C)),$$

wherein ft(□) represents a Fourier transform, ift(□) represents an inverse Fourier transform, and real(□) represents an operation of taking a real part;

(2-7) calculating a scale transformation coefficient λ according to $$\lambda = \frac{sum(S_a)}{sum(s_b)},$$

wherein sum(□) represents a summation operation; and (2-8) calculating the seismic wavelet $w_b$ with the rich low-frequency information according to $$w_b = \frac{w}{\lambda};$$

(3) convoluting the seismic wavelet $w_b$ with the rich low-frequency information and the seismic reflection coefficients obtained by the second inversion in step (1), to obtain a seismic data set with the rich low-frequency information and enhanced low-frequency energy; and b) generating and displaying a seismic image of the deep carbonate reservoir based on enhanced low-frequency seismic data.

* * * * *